United States Patent
Motohira

(10) Patent No.: US 12,485,916 B2
(45) Date of Patent: Dec. 2, 2025

(54) IN-VEHICLE CONTROL DEVICE

(71) Applicant: TOYOTA JIDOSHA KABUSHIKI KAISHA, Toyota (JP)

(72) Inventor: Akito Motohira, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 18/594,116

(22) Filed: Mar. 4, 2024

(65) Prior Publication Data

US 2024/0409110 A1  Dec. 12, 2024

(30) Foreign Application Priority Data

Jun. 6, 2023  (JP) ................................. 2023-093287

(51) Int. Cl.
*B60W 50/14* (2020.01)
*B60L 58/13* (2019.01)

(52) U.S. Cl.
CPC ............. *B60W 50/14* (2013.01); *B60L 58/13* (2019.02); *B60L 2250/16* (2013.01); *B60W 2050/146* (2013.01); *B60W 2510/244* (2013.01)

(58) Field of Classification Search
CPC .......... B60W 50/14; B60W 2050/146; B60W 2510/244; B60W 50/085; B60L 58/13; B60L 2250/16; B60L 2240/80; B60L 53/665; B60K 35/21; B60K 2360/168; B60K 2360/169; B60K 35/28; B60K 35/81; H02J 7/0049; H02J 7/0047; H02J 7/0048; Y02T 10/70

See application file for complete search history.

(56) References Cited

U.S. PATENT DOCUMENTS

| | | | |
|---|---|---|---|
| 7,237,203 B1 | 6/2007 | Kuenzner | |
| 8,368,347 B2 * | 2/2013 | Mitsutani | ............... B60L 53/11 320/104 |
| 2010/0191404 A1 | 7/2010 | Ishikawa et al. | |
| 2014/0330453 A1 | 11/2014 | Nakagawa | |

(Continued)

FOREIGN PATENT DOCUMENTS

| | | |
|---|---|---|
| JP | H11-208313 A | 8/1999 |
| JP | 2011-091879 A | 5/2011 |
| JP | 2011-166870 A | 8/2011 |

(Continued)

*Primary Examiner* — Brian A Zimmerman
*Assistant Examiner* — Cal J Eustaquio
(74) *Attorney, Agent, or Firm* — Oliff PLC

(57) ABSTRACT

An in-vehicle control device, configured to control charging of a power storage device that is installed in a vehicle, includes a processor. The processor is configured to output a first necessary charging time to a display device when a predetermined condition is satisfied while charging the power storage device. The first necessary charging time is an amount of time required for a storage proportion of the power storage device to reach a predetermined storage proportion that is lower than a full-charge proportion. The processor is configured to output a second necessary charging time to the display device when the predetermined condition is not satisfied while charging the power storage device. The second necessary charging time is an amount of time required for the storage proportion of the power storage device to reach the full-charge proportion.

10 Claims, 4 Drawing Sheets

(56) References Cited

U.S. PATENT DOCUMENTS

2020/0171970 A1   6/2020   Lee

FOREIGN PATENT DOCUMENTS

| JP | 2012-025211 A | 2/2012 |
| JP | 2015-109736 A | 6/2015 |
| KR | 101936960 B1 | 1/2019 |
| KR | 10-2021-0020645 A | 2/2021 |
| WO | 2012117829 A1 | 9/2012 |

* cited by examiner

IN-VEHICLE CONTROL DEVICE

CROSS-REFERENCE TO RELATED APPLICATION

This application claims priority to Japanese Patent Application No. 2023-093287 filed on Jun. 6, 2023, incorporated herein by reference in its entirety.

BACKGROUND

1. Technical Field

The present disclosure relates to an in-vehicle control device configured to control charging of a power storage device installed in the vehicle using electric power from an external power source.

2. Description of Related Art

An in-vehicle control device is proposed in which, while a battery installed in a vehicle is being rapidly charged, necessary time that will be required to reach full charge, and necessary time that will be required to reach a predetermined charge state that is lower than full charge, are displayed on a liquid crystal display panel installed in the vehicle (e.g., see Japanese Unexamined Patent Application Publication No. 2012-025211 (JP 2012-025211 A)). In this device, displaying the necessary time that will be required to reach full charge and the necessary time that will be required to reach a predetermined charge state on the liquid crystal display panel enables a user to easily check the charge state when charging the battery.

SUMMARY

However, in the above device, the necessary time that will be required to reach full charge and the necessary time that will be required to reach a predetermined charge state are displayed on the liquid crystal display panel, and accordingly displayed contents are not simple and may be misread by the user. Also, some users may desire to display just one of the necessary time that will be required to reach full charge and the necessary time that will be required to reach a predetermined charge state.

The present disclosure provides an in vehicle control device that more appropriately displays necessary time required for charging while a power storage device installed in the vehicle is being charged by electric power from an external power source.

An in-vehicle control device according to a first aspect of the present disclosure is configured to control charging of a power storage device that is installed in a vehicle, using electric power from an external power source. The in-vehicle control device includes a processor. The processor is configured to output a first necessary charging time to a display device when a predetermined condition is satisfied while charging the power storage device using the electric power from the external power source. The first necessary charging time is an amount of time required for a storage proportion of the power storage device to reach a predetermined storage proportion that is lower than a full-charge proportion. The processor is configured to output a second necessary charging time to the display device when the predetermined condition is not satisfied while charging the power storage device using the electric power from the external power source. The second necessary charging time is an amount of time required for the storage proportion of the power storage device to reach the full-charge proportion.

In the in-vehicle control device according to the first aspect of the present disclosure, the predetermined condition may be a first condition in which the storage proportion of the power storage device is lower than the predetermined storage proportion.

In the in-vehicle control device according to the first aspect of the present disclosure, the predetermined condition may be a second condition in which the storage proportion of the power storage device is lower than the predetermined storage proportion and also charging is performed using direct current electric power from an external direct current power source.

In the in-vehicle control device according to the first aspect of the present disclosure, the display device may be a mobile terminal of a user.

In the in-vehicle control device according to the first aspect of the present disclosure, the predetermined storage proportion may be a proportion within a range of 70% to 90% as to the full-charge proportion.

In the in-vehicle control device according to the first aspect of the present disclosure, while charging the power storage device using electric power from the external power source, the first necessary charging time required for the storage proportion of the power storage device to reach the predetermined storage proportion that is lower than the full-charge proportion is output to the display device when the predetermined condition is satisfied, and the second necessary charging time required for the storage proportion of the power storage device to reach the full-charge proportion is output to the display device when the predetermined condition is not satisfied. According to the above configuration, the display on the display device while charging can be simplified, and misreading by the user can be suppressed. As a result, the necessary time required for charging can be displayed more appropriately while charging. Here, the predetermined condition may be a condition in which the storage proportion of the power storage device is lower than the predetermined storage proportion, or a condition in which charging is performed using direct current electric power from the external direct current power source in addition to this condition. Thus, when the storage proportion of the power storage device is lower than the predetermined storage proportion, the first necessary charging time required for the storage proportion of the power storage device to reach the predetermined storage proportion is displayed on the display device, and when the storage proportion of the power storage device becomes greater than the predetermined storage proportion, the second necessary charging time required for the storage proportion of the power storage device to reach the full-charge proportion is displayed on the display device. Examples of the display device include a liquid crystal display device built into an instrument panel of the vehicle, a display device built into an automotive navigation system, and a mobile terminal (smartphone, tablet, or the like) of the user. Note that, for the predetermined storage proportion, a proportion within the range of 70% to 90% of the full-charge proportion, for example, may be used.

An in-vehicle control device according to a second aspect of the present disclosure is configured to control charging of a power storage device that is installed in a vehicle, using electric power from an external power source. The in-vehicle control device includes a processor configured to switch between output of a first necessary charging time to a display device and output of a second necessary charging time to the display device, at each predetermined time interval or each operation performed by a user, when a predetermined condition is satisfied while charging the power storage device using the electric power from the external power source. The first necessary charging time is an amount of time required for a storage proportion of the power storage device to reach a predetermined storage proportion that is lower than a full-charge proportion. The second necessary charging time is an amount of time required for the storage proportion of the power storage device to reach the full-charge proportion.

In the in-vehicle control device according to the second aspect of the present disclosure, the predetermined condition may be a first condition in which the storage proportion of the power storage device is lower than the predetermined storage proportion.

In the in-vehicle control device according to the second aspect of the present disclosure, the predetermined condition may be a second condition in which the storage proportion of the power storage device is lower than the predetermined storage proportion and also charging is performed using direct current electric power from an external direct current power source.

In the in-vehicle control device according to the second aspect of the present disclosure, the display device may be a mobile terminal of the user.

In the in-vehicle control device according to the second aspect of the present disclosure, the predetermined storage proportion may be a proportion within a range of 70% to 90% as to the full-charge proportion.

In the in-vehicle control device according to the second aspect of the present disclosure, when the predetermined condition is satisfied while the power storage device is being charged using electric power from the external power source, output of the first necessary charging time required for the storage proportion of the power storage device to reach the predetermined storage proportion that is lower than the full-charge proportion to the display device, and output of the second necessary charging time required for the storage proportion of the power storage device to reach the full-charge proportion to the display device, are switched at each predetermined time interval or each operation performed by the user. By switching the first necessary charging time and the second necessary charging time at predetermined time intervals, the necessary time required for charging can be displayed more appropriately while charging. Here, the predetermined condition may be a condition in which the storage proportion of the power storage device is lower than the predetermined storage proportion, or a condition in which charging is performed using direct current electric power from the external direct current power source in addition to this condition. In this way, when the power storage proportion of the power storage device is lower than the predetermined power storage proportion, the first necessary charging time and the second necessary charging time are switched and displayed on the display device, and when the power storage proportion of the power storage device becomes higher than the predetermined power storage proportion, the second necessary charging time is displayed on the display device. Examples of the display device include a liquid crystal display device built into an instrument panel of the vehicle, a display device built into an automotive navigation system, and a mobile terminal (smartphone, tablet, or the like) of the user. Note that, for the predetermined storage proportion, a proportion within the range of 70% to 90% of the full-charge proportion, for example, may be used.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
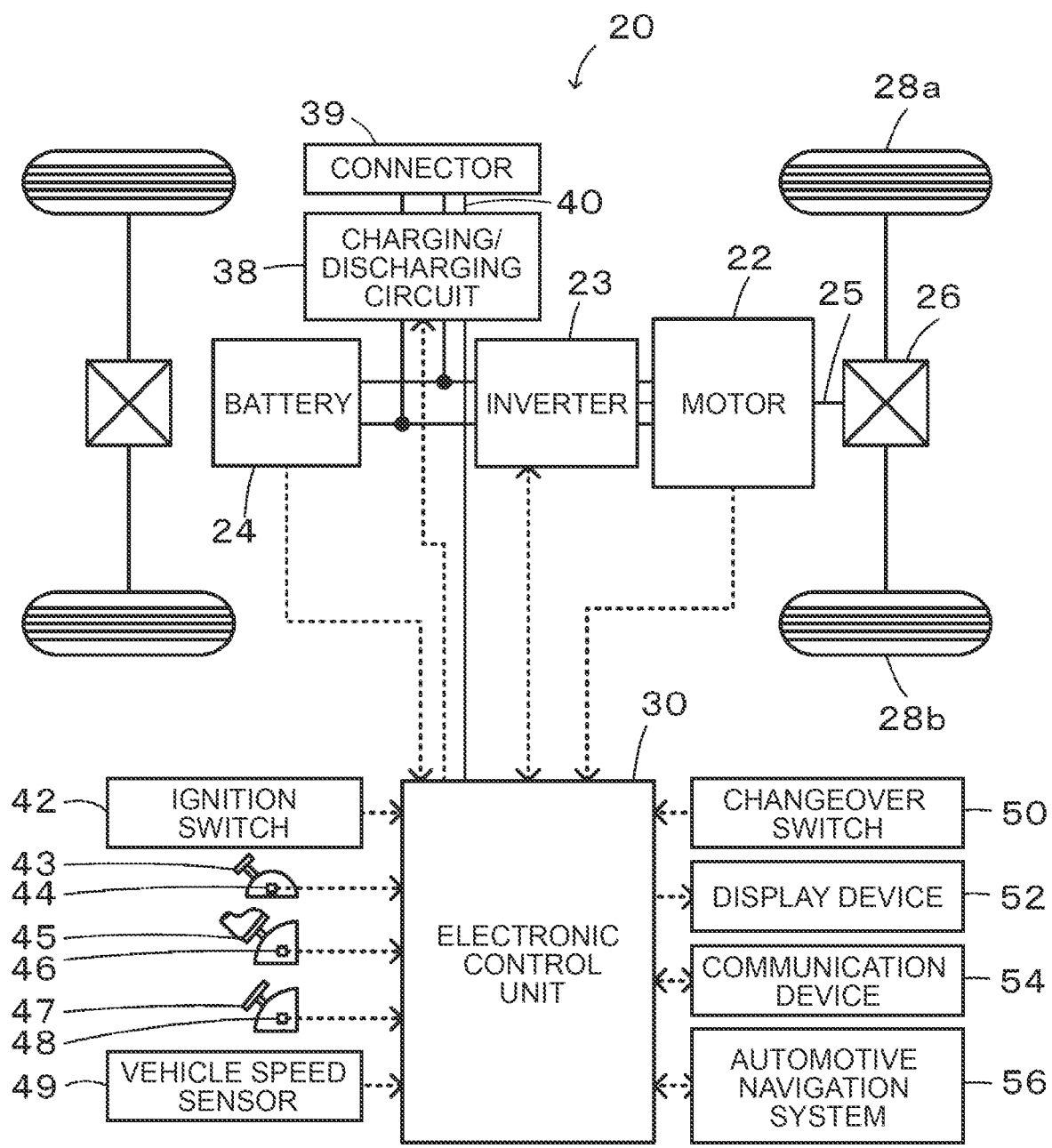
FIG. 1 is a configuration diagram illustrating an overview of a configuration of an electrified vehicle equipped with an in-vehicle control device according to an embodiment of the present disclosure.

A first embodiment of the present disclosure will be described. FIG. 1 is a configuration diagram illustrating an overview of a configuration of an electrified vehicle 20 equipped with an in-vehicle control device according to the first embodiment of the present disclosure. The electrified vehicle 20 includes a motor 22, an inverter 23, a battery 24, a charging/discharging circuit 38, a connector 39, and an electronic control unit 30.

The motor 22 is configured as, for example, a synchronous motor generator. A rotor of the motor 22 is connected to a drive shaft 25 that is linked to drive wheels 28a and 28b via a differential gear 26. The motor 22 is driven by direct current electric power from the battery 24 being converted into three-phase alternating current electric power by the inverter 23, and applying the three-phase alternating power by the inverter 23. Note that the battery 24 is configured as a known lithium-ion secondary battery or nickel-metal hydride secondary battery.

The charging/discharging circuit 38 has one end thereof connected to an electric power line connected to the battery 24, and the other end thereof connected to the connector 39 that is connected to an external power source. The charging/discharging circuit 38 has a charging/discharging relay that is omitted from illustration, and can connect to and disconnect from the battery 24 using the charging/discharging relay.

The electronic control unit 30 is configured as a microcomputer, which is made up primarily of a central processing unit (CPU) that is omitted from illustration. Signals from various types of sensors are input to the electronic control unit 30 via an input port. For example, the electronic control unit 30 inputs an ignition signal from an ignition switch 42, a shift position SP from a shift position sensor 44 for detecting a position of a shift lever 43, an accelerator operation amount Acc from an accelerator pedal position sensor 46 for detecting depression amount of an accelerator pedal 45, a brake pedal position BP from a brake pedal position sensor 48 for detecting depression amount of a brake pedal 47, a vehicle speed V from a vehicle speed sensor 49, and so forth. The electronic control unit 30 also inputs a rotational position θ from a rotational position sensor (omitted from illustration) that detects a rotational position of the motor 22, battery voltage Vb from a voltage sensor (omitted from illustration) that is attached to an output terminal of the battery 24, battery current Ib from a current sensor (omitted from illustration) that is attached to the output terminal of battery 24, charging/discharging voltage Vchg from a voltage sensor that is attached to the charging/discharging circuit 38, charging/discharging current Ichg from a current sensor that is attached to the charging/discharging circuit 38, and so forth. Further, the electronic control unit 30 also inputs a switch signal SW from a changeover switch 50 for switching various types of displays on the display device 52.

The electronic control unit 30 outputs various types of control signals via an output port. For example, the electronic control unit 30 outputs a display control signal to the display device 52, a communication control signal to a communication device 54, and so forth. The electronic control unit 30 also outputs a switching control signal for switching a switching element (omitted from illustration) to the inverter 23 for driving the motor 22, a drive control signal to a system main relay (omitted from illustration) attached near the battery 24, and a drive control signal to the charging/discharging relay (omitted from illustration) attached to the charging/discharging circuit 38. The electronic control unit 30 communicates with an automotive navigation system 56 that displays various types of information, provides route guidance, and so forth. A signal line 40 is connected to the electronic control unit 30 for communicating with an external power source side when the external power source is connected to the connector 39.

The electronic control unit 30 calculates revolutions Nm of the motor 22 based on the rotational position θ from the rotational position sensor (omitted from illustration) that detects the rotational position of the motor 22, calculates a storage proportion SOC of the battery 24 based on the battery voltage Vb and the battery current Ib, and so forth. The storage proportion SOC is the proportion of the remaining charge as to the total capacity of the battery 24.

Figure 2:
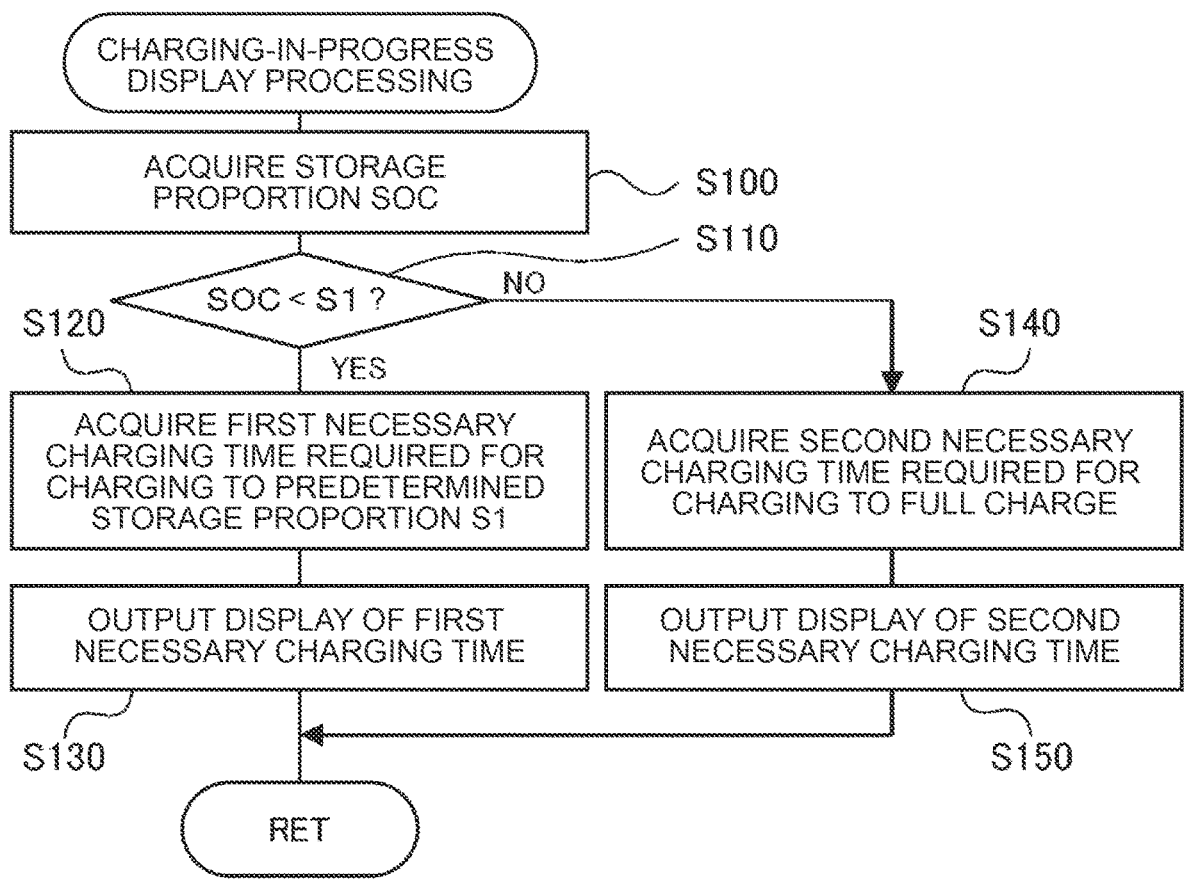
FIG. 2 is a flowchart showing an example of charging-in-progress display processing that is executed by an electronic control unit.

Next, operations of the electrified vehicle 20 according to the embodiment, particularly operations of displaying a charge state when the battery 24 is being charged using electric power from an external power source, will be described. Note that in the embodiment, a description will be made regarding a display on the display device 52 regarding charging while the connector 39 is connected to an external direct current power source and the battery 24 is being charged by direct current electric power supplied from the external direct current power source. FIG. 2 is a flowchart showing an example of charging-in-progress display processing that is executed by the electronic control unit 30 while charging. This charging-in-progress display processing is repeatedly executed at predetermined time intervals (e.g., every 30 seconds or 1 minute) while the battery 24 is being charged.

When the charging-in-progress display processing is executed, the electronic control unit 30 first acquires the storage proportion SOC of the battery 24 (step S100). In the embodiment, the storage proportion SOC is acquired by inputting values calculated based on the battery voltage Vb and the battery current Ib. Next, determination is made regarding whether the storage proportion SOC of the battery 24 is lower than a predetermined storage proportion S1 that is lower than the full-charge proportion (100%) (step S110). For the predetermined storage proportion S1, 70%, 80%, 90%, or the like, for example, can be used.

When determination is made in step S110 that the storage proportion SOC of the battery 24 is lower than the predetermined storage proportion S1, a first necessary charging time required until the storage proportion SOC of the battery 24 reaches the predetermined storage proportion S1 by performing charging using direct current electric power from the external direct current power source is acquired (step S120). In the first embodiment, a relation between charging voltage (battery voltage Vb) and the first necessary charging time is found in advance through experimentation or machine learning and stored as a map for setting the first necessary charging time, and when the charging voltage is provided, the first necessary charging time is acquired by deriving the corresponding first necessary charging time from the map. The first necessary charging time that is acquired is then output by display on the display device 52 (step S130). Thus, the processing ends.

When the charging of the battery 24 by the external direct current power source progresses, and the storage proportion SOC of the battery 24 is no lower than the predetermined storage proportion S1, a negative determination is made in step S110, and a second necessary charging time required for the charging of the battery 24 by the external direct current power source to reach the full-charge proportion (100%) is acquired (step S140). In the first embodiment, the relation between the charging voltage (battery voltage Vb) and the second necessary charging time is found in advance through experimentation or machine learning and stored as a map for setting the second necessary charging time, and when the charging voltage is provided, the second necessary charging time is acquired by deriving the corresponding second necessary charging time from the map. The second necessary charging time that is acquired is then output by display on the display device 52 (step S150). Thus, the processing ends.

Figure 3:
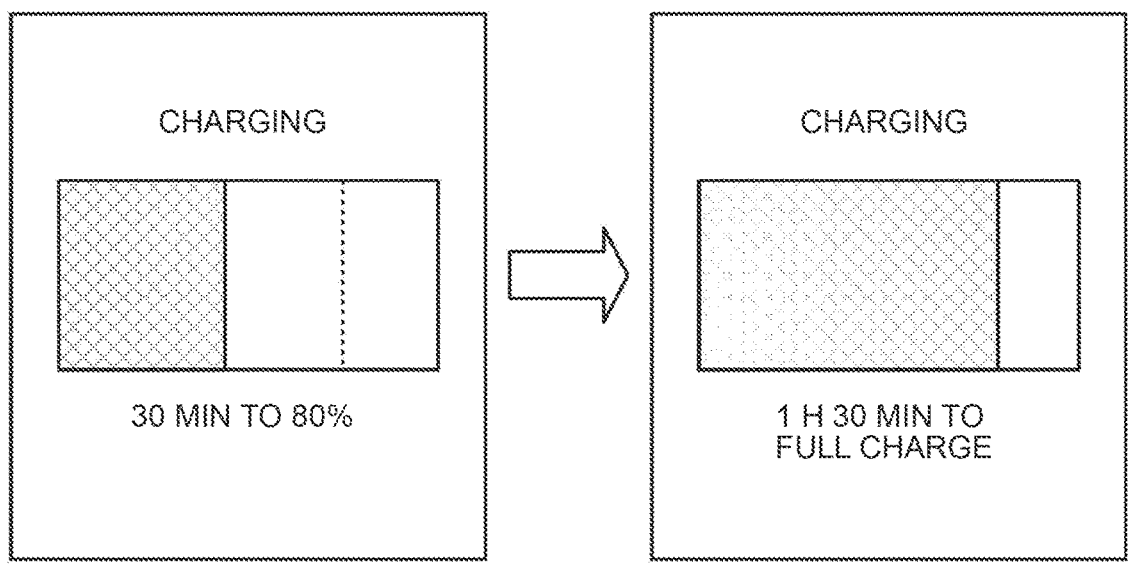
FIG. 3 is an explanatory diagram illustrating an example of the way in which a display on a display device switches from a display of a first necessary charging time to a display of a second necessary charging time.

FIG. 3 is an explanatory diagram illustrating an example of the way in which the display switches from display of the first necessary charging time on the display device 52 to display of the second necessary charging time on the display device 52. In FIG. 3, 80% is used as the predetermined storage proportion S1, and the storage proportion SOC of the battery 24 at that time is displayed as an image as well. In the charging-in-progress display processing, when the storage proportion SOC of the battery 24 is lower than the predetermined storage proportion S1, the first necessary charging time (30 minutes) required for the storage proportion SOC of the battery 24 to reach the predetermined storage proportion S1 (80%) is displayed on the display device 52, as illustrated to the left side in FIG. 3. When the storage proportion SOC of the battery 24 is no longer lower than the predetermined storage proportion S1 (80%), the display of the first necessary charging time on the display device 52 is switched, and the second necessary charging time (1 hour 30 minutes) required for the storage proportion SOC of the battery 24 to reach the full-charge proportion (100%) is displayed on the display device 52.

In the electronic control unit 30 installed in the electrified vehicle 20 according to the first embodiment described above, while the battery 24 is being charged by the external direct current power source, when the storage proportion SOC of the battery 24 is lower than the predetermined storage proportion S1, the first necessary charging time required for the storage proportion SOC of the battery 24 to reach the predetermined storage proportion S1 is displayed on the display device 52, following which, when the storage proportion SOC of the battery 24 is no lower than the predetermined storage proportion S1, the display device 52 switches to displaying the second necessary charging time required for the storage proportion SOC of the battery 24 to reach the full-charge proportion (100%). Thus, the display on the display device 52 while charging can be simplified, and misreading by the user can be suppressed. As a result, the necessary time required for charging can be displayed more appropriately while charging.

Next, a second embodiment of the present disclosure will be described. In the second embodiment, the same hardware configuration (configuration of the electrified vehicle 20) as in the first embodiment is used, and accordingly, description of the hardware configuration (configuration of the electrified vehicle 20) according to the second embodiment will be omitted. In the second embodiment, while the battery 24 is being charged using an external direct current power source, the electronic control unit 30 executes the charging-in-progress display processing exemplified in FIG. 4. The charging-in-progress display processing in FIG. 4 is also repeatedly executed at predetermined time intervals (e.g., every 30 seconds or 1 minute) while the battery 24 is being charged.

Figure 4:
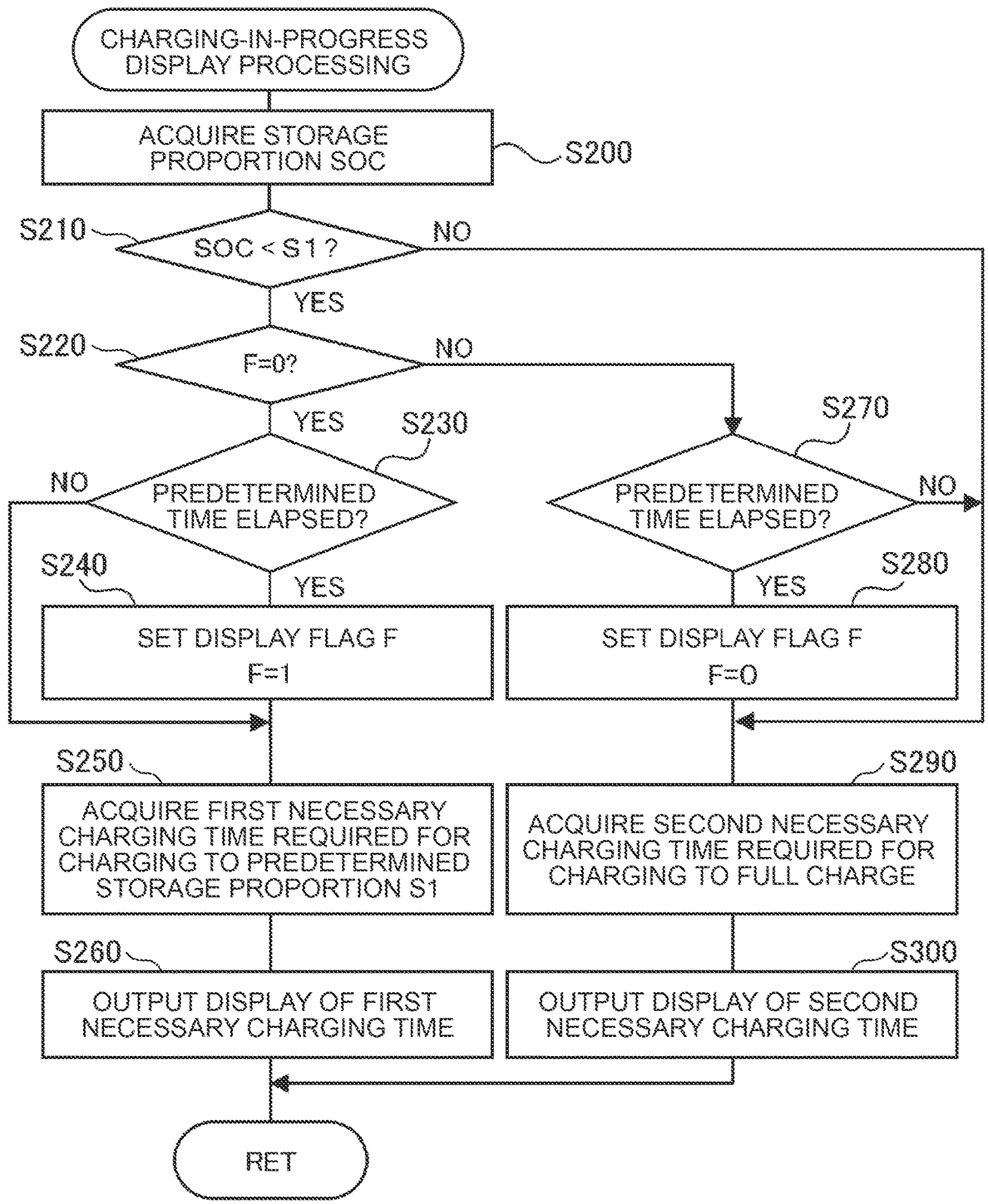
FIG. 4 is a flowchart showing an example of charging-in-progress display processing according to a modification.

When the charging-in-progress display processing in FIG. 4 is executed, the electronic control unit 30 acquires the storage proportion SOC of the battery 24 (step S200), and determination is made regarding whether the storage proportion SOC of the battery 24 that is acquired is lower than the predetermined storage proportion S1 that is lower than the full-charge proportion (100%) (step S210).

When determination is made in step S210 that the storage proportion SOC of the battery 24 is lower than the predetermined storage proportion S1, a value of a display flag F is checked (step S220). The display flag F is a flag for setting whether the first necessary charging time is to be displayed on the display device 52 or the second necessary charging time is to be displayed on the display device 52, and is set by this charging-in-progress display processing. In the second embodiment, when the value of the display flag F is 0, the first necessary charging time is displayed on the display device 52, and when the value of the display flag F is 1, the second necessary charging time is displayed on the display device 52. When determination is made in step S220 that the value of the display flag F is 0, determination is made regarding whether a predetermined amount of time has elapsed since the display of the first necessary charging time on the display device 52 started (step S230), and when determining that the predetermined amount of time has elapsed, the value of the display flag F is set to 1 (step S240). For the predetermined amount of time, 3 seconds or 5 seconds, 10 seconds or the like, for example, can be used. The first necessary charging time required for the storage proportion SOC of the battery 24 to reach the predetermined storage proportion S1, by the battery 24 being charged by the external direct current power source, is acquired (step S250), and the first necessary charging time that is acquired is output by display on the display device 52 (step S260). Thus, the processing ends.

When determination is made in step S220 that the value of the display flag F is 1, determination is made regarding whether a predetermined amount of time has elapsed since the display of the second necessary charging time on the display device 52 started (step S270), and when determining that the predetermined amount of time has elapsed, the value of the display flag F is set to 0 (step S280). The second necessary charging time required for the storage proportion SOC of the battery 24 to reach the full-charge proportion (100%) by charging the battery 24 by the external direct current power source is then acquired (step S290). The second necessary charging time that is acquired is output by display on the display device 52 (step S300). Thus, the processing ends.

When determination is made in step S210 that the storage proportion SOC of the battery 24 is no lower than the predetermined storage proportion S1, the second necessary charging time required for the storage proportion SOC of the battery 24 to reach the full-charge proportion (100%) by charging the battery 24 by the external direct current power source is acquired (step S290). The second necessary charging time that is acquired is output by display on the display device 52 (step S300). Thus, the processing ends.

In the second embodiment described above, while the battery 24 is being charged by the external direct current power source, when the storage proportion SOC of the battery 24 is lower than the predetermined storage proportion S1, switching between the first necessary charging time being displayed on the display device 52 (e.g., the left side in FIG. 3) and the second necessary charging time being displayed on the display device 52 (e.g., the right side in FIG. 3) is performed at predetermined time intervals, and when the storage proportion SOC of the battery 24 is no lower than the predetermined storage proportion S1, the second necessary charging time required for the storage proportion SOC of the battery 24 to reach the full-charge proportion (100%) is displayed on the display device 52. Thus, the display on the display device 52 while charging can be simplified, and misreading by the user can be suppressed. As a result, the necessary time required for charging can be displayed more appropriately while charging.

Figure 5:
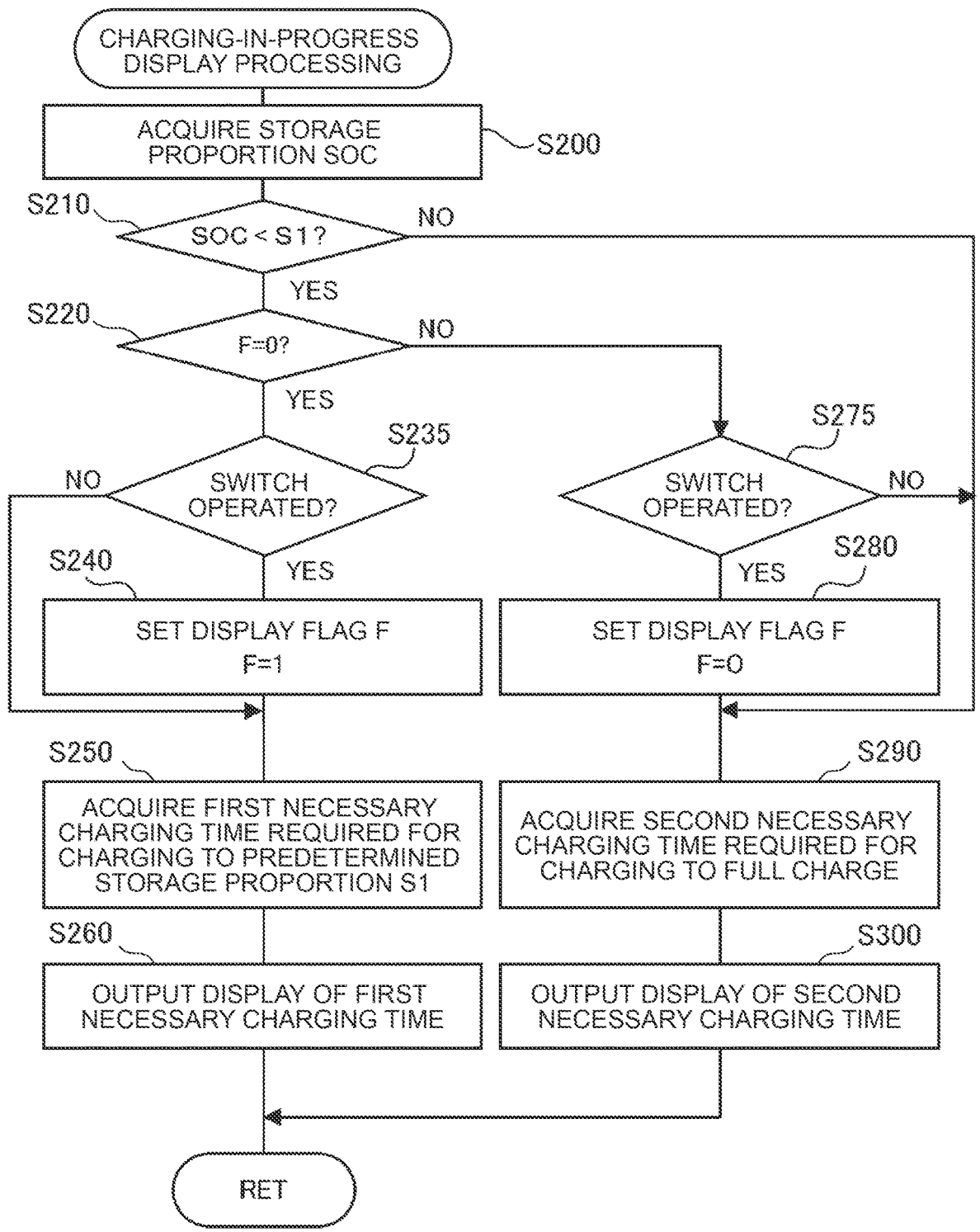
FIG. 5 is a flowchart showing an example of charging-in-progress display processing according to a modification.

In the second embodiment, while the battery 24 is being charged by the external direct current power source, when the storage proportion SOC of the battery 24 is lower than the predetermined storage proportion S1, switching between the first necessary charging time being displayed on the display device 52 and the second necessary charging time being displayed on the display device 52 is performed at predetermined time intervals. However, an arrangement may be made in which, when the changeover switch 50 is operated by the user, the display of the first necessary charging time on the display device 52 and the display of the second necessary charging time on the display device 52 are switched. An example of charging-in-progress display processing in this case is shown in FIG. 5. In the charging-in-progress display processing of FIG. 5, instead of determining whether a predetermined period of time has elapsed since switching the display in step S230 and step S270 of FIG. 4, determination of whether the changeover switch 50 has been operated (steps S235 and S275) is performed. That is to say, when determination is made in step S220 that the value of the display flag F is 0, whether the changeover switch 50 has been operated is determined (step S235), and when determining that the changeover switch 50 has been operated, the value of the display flag F is set to 1 (step S240), the first necessary charging time required for the storage proportion SOC of the battery 24 to reach the predetermined storage proportion S1 by charging the battery 24 by the external direct current power source is acquired (step S250), and the first necessary charging time that is acquired is output by display on the display device 52 (step S260). Thus, the processing ends. When determination is made in step S220 that the value of the display flag F is 1, whether the changeover switch 50 has been operated is determined (step S275), and when determining that the changeover switch 50 has been operated, the value of the display flag F is set to 0 (step S280), the second necessary charging time required for the storage proportion SOC of the battery 24 to reach the full-charge proportion (100%) by charging the battery 24 by the external direct current power source is acquired (step S290). The second necessary charging time that is acquired is output by display on the display device 52 (step S300). Thus, the processing ends. In this case as well, the display on the display device 52 while charging can be simplified, and misreading by the user can be suppressed.

In the first embodiment and the second embodiment, the first necessary charging time and the second necessary charging time are displayed on the display device 52 that is installed in the vehicle. However, display may be made on a display unit of a mobile terminal, such as a smartphone, a tablet, or the like. In this case, an arrangement can be made in which the electronic control unit 30 transmits the first necessary charging time or the second necessary charging time to a mobile terminal of the user via the communication device 54, the first necessary charging time or the second necessary charging time is received by the mobile terminal of the user in which application software for displaying is installed, and the display exemplified in FIG. 3 is displayed on a display unit of the mobile terminal.

In the first embodiment and the second embodiment, processing is performed in which the first necessary charging time and the second necessary charging time are displayed on the display device 52 while the connector 39 is connected to the external direct current power source and the battery 24 is being charged by direct current electric power supplied from the external direct current power source. However, processing may be performed in which the first necessary charging time and the second necessary charging time are displayed on the display device 52 while the connector 39 is connected to an external alternating current power source and the battery 24 is being charged by alternating current electric power supplied from the external alternating current power source.

Description will be given regrading correspondences between principal elements in the embodiments and principal elements of the present disclosure described in the "SUMMARY" section. In the embodiments, the battery 24 is an example of "power storage device", the electronic control unit 30 is an example of "in-vehicle control device", and the display device 52 is an example of "display device."

It should be noted that the correspondences between the principal elements in the embodiments and the principal elements of the present disclosure described in the "SUMMARY" section are examples for describing in detail the modes for carrying out the present disclosure described in the "SUMMARY" section by the embodiments, and accordingly the correspondences are not intended to limit the elements of the present disclosure described in the "SUMMARY" section. That is to say, the present disclosure described in the "SUMMARY" section should be interpreted based on the description in that section, and the embodiments are only specific examples of the present disclosure described in the "SUMMARY" section.

Although the present disclosure has been described above by way of embodiments, the present disclosure is not limited to such embodiments whatsoever, and may be carried out in various modes without departing from the spirit of the present disclosure, as a matter of course.

The present disclosure is applicable to the manufacturing industry of in-vehicle control devices or the like.

What is claimed is:

1. An in-vehicle control device configured to control charging of a power storage device that is installed in a vehicle, using electric power from an external power source, the in-vehicle control device comprising a processor configured to
   output a first necessary charging time to a display device when a predetermined condition is satisfied while charging the power storage device using the electric power from the external power source, the first necessary charging time is an amount of time required for a storage proportion of the power storage device to reach a predetermined storage proportion that is lower than a full-charge proportion, and
   output a second necessary charging time to the display device when the predetermined condition is not satisfied while charging the power storage device using the electric power from the external power source, the second necessary charging time is an amount of time required for the storage proportion of the power storage device to reach the full-charge proportion.

2. The in-vehicle control device according to claim 1, wherein the predetermined condition is a first condition in which the storage proportion of the power storage device is lower than the predetermined storage proportion.

3. The in-vehicle control device according to claim 2, wherein the predetermined condition is a second condition in which the storage proportion of the power storage device is lower than the predetermined storage proportion and also charging is performed using direct current electric power from an external direct current power source.

4. The in-vehicle control device according to claim 1, wherein the display device is a mobile terminal of a user.

5. The in-vehicle control device according to claim 1, wherein the predetermined storage proportion is a proportion within a range of 70% to 90% as to the full-charge proportion.

6. An in-vehicle control device configured to control charging of a power storage device that is installed in a vehicle, using electric power from an external power source, the in-vehicle control device comprising a processor configured to switch between output of a first necessary charging time to a display device and output of a second necessary charging time to the display device, at each predetermined time interval or each operation performed by a user, when a predetermined condition is satisfied while charging the power storage device using the electric power from the external power source, the first necessary charging time is an amount of time required for a storage proportion of the power storage device to reach a predetermined storage proportion that is lower than a full-charge proportion, and the second necessary charging time is an amount of time required for the storage proportion of the power storage device to reach the full-charge proportion.

7. The in-vehicle control device according to claim 6, wherein the predetermined condition is a first condition in which the storage proportion of the power storage device is lower than the predetermined storage proportion.

8. The in-vehicle control device according to claim 7, wherein the predetermined condition is a second condition in which the storage proportion of the power storage device is lower than the predetermined storage proportion and also charging is performed using direct current electric power from an external direct current power source.

9. The in-vehicle control device according to claim 6, wherein the display device is a mobile terminal of a user.

10. The in-vehicle control device according to claim 6, wherein the predetermined storage proportion is a proportion within a range of 70% to 90% as to the full-charge proportion.

* * * * *